United States Patent Office 3,066,158
Patented Nov. 27, 1962

3,066,158
NITROSOPHENYL - N,N - DI(MONOHYDROXYALKYL)-SULFONAMIDES AND THEIR METHODS OF PREPARATION
Adnan A. R. Sayigh, New Haven, Conn., assignor to The Carwin Company, North Haven, Conn., a corporation of Connecticut
No Drawing. Filed Apr. 28, 1961, Ser. No. 106,170
13 Claims. (Cl. 260—397.7)

This invention relates to new chemical compounds and method of making them. More particularly it is concerned with nitroso hydroxyalkyl sulfonamides in which the hydroxyalkyl groups are joined to the amide nitrogen atoms. These compounds can be represented by the general formula $$ONC_6H_4SO_2N(\text{alkylene OH})_2$$

in which alkylene represent an alkylene group of at least two carbon atoms but not more than four carbon atoms, namely ethylene, propylene, and butylene. In the case of ethylene and preferably in the case of propylene and butylene, the hydroxyl groups are on the terminal carbon atoms of the chains which in the case of butylene is preferably also unbranched.

The compounds of this invention can be used in the manufacture of nitroso-containing polymers. For instance, with phthalic acids, or other polycarboxylic acids, they form condensation polymers, and with polyisocyanates, either aromatic or aliphatic, they undergo addition polymerization to form polyurethanes. The reaction that takes place in the formation of condensation polymers can be illustrated by the following equation with specific reference to a nitroso-N,N-bis(4-hydroxybutyl)benzenesulfonamide and adipic acid for convenience:

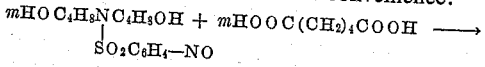

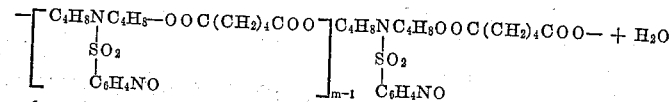

The reaction that takes place in the formation of polyurethanes can be illustrated by the following equation, with specific reference a nitroso-N,N-bis(3-hydroxypropyl)benzenesulfonamide and phenylene diisocyanate, here also as a matter of convenience:

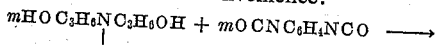

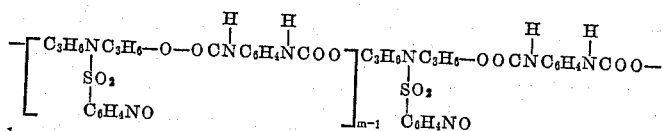

In forming these polymers, condensation and addition, the nitroso groups do not enter into the polymer forming reaction provided due care is exercised in the conditions employed but are incorporated into the polymer as an integral part of the molecular structure, while retaining the chemical properties and reactivities characteristic of nitroso groups.

The usefulness of these high molecular weight nitroso compounds in various applications will be readily appreciated by persons knowledgeable in the arts, to whom this patent is directed. By way of illustration such nitroso compounds as the dinitrosobenzenes, paranitrosophenol, N-methyl-N,4-dinitrosoaniline are used in vulcanization processes to increase the speed of vulcanization and to improve the properties of the final rubber product. Although the mechanism of the effect of the nitroso com- pounds in vulcanization processes may not be known with certainty, it is believed that they may serve as cross-linking agents to establish cross-links between the long hydrocarbon chains present in the rubber materials.

The nitroso-containing polymers of this invention can be used similarly to the nitroso containing nonpolymers heretofore employed, and have the advantage of containing from a small to a large number of nitroso groups to the molecule as may be desired. Furthermore, in these nitroso-containing polymers the nitroso groups are distributed regularly through the polymer molecule. The large molecules have the added advantage of low volatility and are less subject to loss, as by volatilization or evaporation during the processing at high temperatures as in vulcanization. If desired the nitroso containing polymers can themselves be used as adhesives for rubber to metal.

The new nitroso hydroxyl alkyl sulfonamides of this invention can also be used in organic syntheses by way of reaction through the nitroso group, as for instance by reaction with dienes to produce a Diels-Alder adduct. The following equation is illustrative:

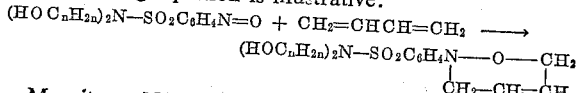

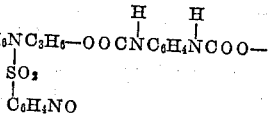

My nitroso-N,N-hydroxyalkyl benzenesulfonamides can be prepared by reduction of the corresponding nitro-N,N-dihydroxyalkyl benzenesulfonamides to the hydroxylamine compound followed by mild oxidation of the hydroxylamine group back to the nitroso group. The reaction that takes place during the reduction can be represented as follows:

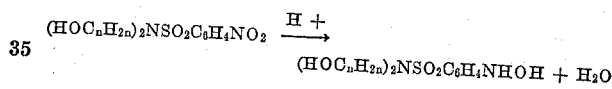

Preferably the reduction is carried out in aqueous solution that is weakly acidic to neutral. It can be effected by metal, as for instance zinc metal, preferably in finely divided form. Zinc powder is very effective. Temperatures of about 40° to 60° C. are recommended but higher and lower temperatures can be used, if desired. In using higher temperatures, it should be borne in mind that the hydroxylamine is very reactive and undergoes mutual oxidation and reduction readily. It is also oxidized fairly rapidly by atmospheric oxygen to azoxy compounds and accordingly it may be found suitable to carry out the reduction in an inert atmosphere. In addition to zinc, aluminum amalgam and hydrogen sulfide in the cold can also be used.

The back oxidation of the hydroxylamine compound to my nitroso compound can be brought about by the use of a mild oxidizing agent, for instance, ferric chloride which is preferred. Ferric sulfate can also be used but ferric nitrate can not. Nor can strong oxidizing agents such as the chromates or dichromates be used, or any hexavalent chromium-containing compound.

The oxidation reaction that takes place can be represented by the following equation:

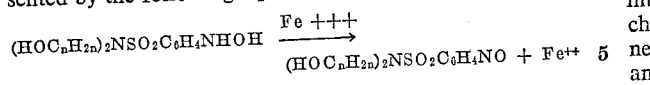

Preferably, the oxidation of the hydroxylamine group to the nitroso group is carried out directly but subsequently upon the reduction of the nitro group without separation and recovery of the hydroxylamine compound as such. If the back oxidation is not carried out directly, the hydroxylamine should be recovered using known expedients and stored dry until use. If desired the reduction of the nitro group can be carried out electrolytically directly to the nitroso group.

The nitro - N,N - dihydroxyalkylbenzenesulfonamide which is to be converted to the nitroso compound can itself be obtained by the action of dialkanol amines on nitrobenzenesulfonylchlorides. Suitable dialkanol amines are diethanolamine; di-1,2-propanolamine; di-1,3-propanolamine; di-1,2-butanolamine; di-2,3-butanolamine; di-1,3-butanolamine; di-1,4-butanolamine, as well as mixed dialkanolamines of which the following are representative, ethanol propanolamine; ethanol butanolamine and propanol butanolamine. As to the nitrobenzenesulfonylchloride, the nitro group can be ortho, meta or para. Meta-nitrobenzene sulfonylchloride and para-nitrobenzene sulfonylchloride are preferred, however.

The reaction between the alkanol amine and the nitrobenzene sulfonylchloride can be represented by the following equation:

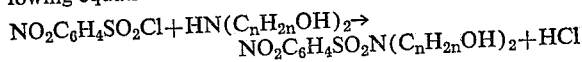

in which $n$ is 2, 3 or 4, not necessarily the same for both alkanol groups. The reaction can readily be carried out by adding the nitrobenzene sulfonylchloride portionwise or continuously at a suitable rate to the dialkanolamine in solution in a non-reactive solvent, for instance dimethyl formamide. The reaction is exothermic and in the absence of cooling the temperature of the reaction mixture can rise to as high as about 75° to 80° C. When all the sulfonylchloride is added, the reaction mixture is maintained at a temperature of about 100° C., as on a steam bath for a period to favor completion of the reaction. Thereafter the reaction mixture is cooled and diluted with water to precipitate the product. The product which is a solid can be recovered by any suitable means as by filtering and then reduced and back-oxidized to the nitroso compound as described above.

The following examples are illustrative.

EXAMPLE 1

Synthesis of p-Nitroso-N,N-Bis(2-Hydroxyethyl) Benzenesulfonamide 44.3 grams of p-nitrobenzenesulfonylchloride were added portionwise to a stirred solution of 42.0 grams of diethanolamine in 70 milliliters of dimethylformamide. During the addition, heat was evolved so that the temperature of the reaction mixture rose to about 80° C. When the addition was completed, the reaction mixture was heated on a steam bath for about 30 minutes, and was then poured onto a mixture of cracked ice and water. The solid which was formed was filtered off and dried in air. The dry solid was p-nitro-N,N-bis(2-hydroxyethyl) benzenesulfonamide and had a mass of 58.0 grams. A small sample of this dry solid was crystallized from methyl alcohol. The crystals thus obtained melted in the range of 126–127° C., and analyzed correctly for $C_{10}H_{14}SN_2O_6$.

Calculation for $C_{10}H_{14}SN_2O_6$: C, 41.4; H, 4.8; S, 11.0.
Finding for $C_{10}H_{14}SN_2O_6$: C, 41.7; H, 4.6; S, 10.7.

71 grams of p-nitro-N,N-(2-hydroxyethyl)-benzenesulfonamide made according to the foregoing procedure, 300 cc. of methyl alcohol, and 300 milliliters of water containing 15 grams of ammonium chloride were introduced into a two-liter round bottom flask equipped with a mechanical stirrer, a thermometer, and a solid-addition funnel. The solution was heated on a water bath to 50° C., and 37.2 grams of zinc dust were then added portionwise to the solution over a period of five minutes. After the temperature had risen to about 70° C., the reaction mixture was cooled to about 65° C. in a water bath and was stirred at 65° C. for twenty minutes. The reaction mixture was further cooled to about 55° C. and was filtered with suction to remove the zinc oxide which had formed. The zinc oxide was thoroughly washed portionwise with a total of one liter of boiling methyl alcohol. The combined filtrates were placed in a four-liter beaker, and enough ice was added to the combined filtrates to reduce their temperature to 0° C. Ferric chloride hexahydrate (162 grams in 300 cc. of water) was added rapidly to this cold solution, and the temperature was maintained below 5° C. by further addition of ice. The solution was held at 0° C. for one hour and was then filtered with suction. There was obtained a yellow solid which was washed with 1.5 liters of water followed by 300 cc. of methyl alcohol. The mother liquor was allowed to stand for two days, and the light orange solid which was deposited was collected. The solids were combined, dried in a dessicator, powdered, and finally dried in air. The dry solid was p-nitroso-N,N-bis(2-hydroxyethyl) benzenesulfonamide, and amounted to 58.0 grams. A small amount of this solid was crystallized from a large amount of methyl alcohol. The resulting crystal sample melted in the range of 243° C. to 247° C. and analyzed correctly for $C_{10}H_{14}SN_2O_5$.

Calculation for $C_{10}H_{14}SN_2O_5$: C, 43.8; H, 5.1; N, 10.2.
Finding for $C_{10}H_{14}SN_2O_5$: C, 44.4; H, 4.7; N, 10.3.

The material was soluble in dimethylformamide, but was practically insoluble in most common organic solvents. A solution of acetic acid and aniline was colored red by the material on heating, indicating the formation of an azo-compound. The infra-red spectrum of the material indicated the presence of a nitroso group in the molecule.

EXAMPLE 2

Synthesis of m-Nitroso-N,N-Bis(2-Hydroxyethyl) Benenesulfonamide 44.3 grams of m-nitrobenzenesulfonylchloride were added portionwise to a stirred solution of 42.0 grams of diethanolamine in 70 milliliters of dimethylformamide. During the addition, heat was evolved so that the temperature of the reaction mixture rose to about 80° C. When the addition was completed, the reaction mixture was heated on a steam bath for about thirty minutes, and was then poured onto a mixture of cracked ice and water. The solid which was formed was filtered and dried in air. The dry solids was m-nitro-N,N-bis(2-hydroxyethyl) benzenesulfonamide, and amounted to 45.5 grams, corresponding to 78 percent of the theoretical yield. It melted in the range of 99° C. to 102° C. A small sample of this dry solid was crystallized from methanol. The sample crystals melted in the range of 101° C. to 103° C. and analyzed correctly for $C_{10}H_{14}SN_2O_6$.

Calculation for $C_{10}H_{14}SN_2O_6$: C, 41.4; H, 4.8; S, 11.0.
Finding for $C_{10}H_{14}SN_2O_6$: C, 41.4; H, 5.1; S, 10.8.

71 grams of m-nitro-N,N-bis(2-hydroxyethyl) benzenesufonamide obtained by the foregoing procedure, 300 cc. of methyl alcohol, and 300 cc. of water containing 15 grams of ammonium chloride were introduced into a two-liter round-bottom flask equipped with a mechanical stirrer, a thermometer, and a solid-addition funnel. The solution was heated on a water bath to 50° C., and 37.2 grams of zinc dust were then added portionwise to said solution over a period of five minutes. After the temperature had risen to about 70° C., the reaction mixture was cooled to 65° C. in a water bath and was stirred at 65° C. for twenty minutes. The reaction mixture was further cooled to about 55° C., at which point it was filtered with suction to remove the zinc oxide that formed. The zinc oxide was thoroughly washed with successive portions of boiling methyl alcohol until the filtrate became colorless. The combined filtrates were placed in a four-liter beaker together with enough ice to lower the temperature of the filtrates to 0° C. Ferric chloride hexahydrate (162 grams in 300 cc. of water) was added rapidly to this cold solution, and the temperature of the solution was maintained below 5° C. by further additions of ice. The solution was held at 0° C. to 5° for one hour and was then filtered with suction. The light yellow solid which was obtained was washed with one liter of water followed by 300 cc. of methyl alcohol. The mother liquor was allowed to stand for two days, and the light orange solid which was deposited was collected. The solids were combined, dried in a dessicator, powdered, and finally dried in air. The dry solid was m-nitroso-N,N-bis(2-hydroxyethyl) benzenesulfonamide and amounted to 42 grams, corresponding to 60% of the theoretical yield. A small amount of this material was crystallized from a large amount of methyl alcohol. The resulting crystals of m-nitroso-N,N-bis(2-hydroxyethyl) benzenesulfonamide melted in the range of 196° C. to 198° C., and analyzed correctly for $C_{10}H_{14}SN_2O_5$.

Calculation for $C_{10}H_{14}SN_2O_5$: C, 43.8; H, 5.1; N, 10.2.
Finding for $C_{10}H_{14}SN_2O_5$: C, 44.1; H, 5.3; N, 10.3.

The product was soluble in dimethylformamide, but was practically insoluble in most of the common organic solvents. It gave a positive test for the presence of a nitroso group by turning red when treated with a hot solution of aniline in acetic acid.

I claim:

1. Nitrosophenyl - N,N-di(monohydroxyalkyl)sulfonamide in which each hydroxyalkyl group has at least two carbon atoms with both hydroxyalkyl groups together having a total of not more than eight carbon atoms.

2. Ortho-nitrosophenyl-N,N-di(monohydroxyalkyl)sulfonamide in which each hydroxyalkyl group has at least two carbon atoms with both hydroxyalkyl groups together having a total of not more than eight carbon atoms.

3. Meta-nitrosophenyl-N,N-di(monohydroxyalkyl)sulfonamide in which each hydroxyalkyl group has at least two carbon atoms with both hydroxyalkyl groups together having a total of not more than eight carbon atoms.

4. Para-nitrosophenyl - N,N-di(monohydroxyalkyl)sulfonamide in which each hydroxyalkyl group has at least two carbon atoms with both hydroxyalkyl groups together having a total of not more than eight carbon atoms.

5. Nitrosophenyl - N,N - di(monohydroxyalkyl)sulfonamide in which each hydroxyalkyl group has at least two carbon atoms with both hydroxyalkyl groups together having a total of not more than eight carbon atoms and with the hydroxyl groups attached to terminal carbon atoms.

6. Nitrosophenyl-N,N-di(monohydroxypropyl)sulfonamide.

7. Nitrosophenyl - N,N-di(monohydroxybutyl)sulfonamide.

8. Para - nitrosophenyl-N,N-di(2 - hydroxyethyl)sulfonamide.

9. Meta - nitrosophenyl-N,N-di(2-hydroxyethyl)sulfonamide.

10. Hydroxylaminophenyl-N,N-di(monohydroxyalkyl)sulfonamide having at least two carbon atoms in each hydroxyalkyl group with a total of not more than eight carbon atoms in both hydroxyalkyl groups.

11. The process for making nitrosophenyl-N,N-di(monohydroxyalkyl)sulfonamide having at least two carbon atoms in each hydroxyalkyl group with a total of not more than eight carbon atoms in both hydroxyalkyl groups by reacting the corresponding hydroxylaminophenyl-N,N-di(monohydroxyalkyl)sulfonamide with a ferric salt in substantially neutral aqueous solution as a mild oxidizing agent to convert it to the nitroso compound, said solution being essentially free of nitrate, chromate and dichromate ions.

12. The process of making para-nitrosophenyl-N,N-di(monohydroxyalkyl)sulfonamide having at least two carbon atoms in each hydroxyalkyl group with a total of not more than eight carbon atoms in both hydroxyalkyl groups by reacting the corresponding hydroxylaminophenyl-N,N-di(monohydroxyalkyl)sulfonamide with a ferric salt in susbtantially neutral aqueous soultion as a mild oxidizing agent to convert it to the nitroso compound, said solution being essentially free of nitrate, chromate and dichromate ions.

13. The process for making meta-nitrosophenyl-N,N-di(monohydroxyalkyl)sulfonamide having at least two carbon atoms in each hydroxyalkyl group with a total of not more than eight carbon atoms in both hydroxyalkyl groups by reacting the corresponding hydroxylaminophenyl-N,N-di(monohydroxyalkyl)sulfonamide with a ferric salt in substantially neutral aqueous solution as a mild oxidizing agent to convert it to the nitroso compound, said solution being essentially free of nitrate, chromate and dichromate ions.

References Cited in the file of this patent

Bauer et al.: Journ. Am. Chem. Soc., vol. 66 pages 611–14 (1944).

Kretov et al.: Zhurnal Obshei Khimi, vol. 28, pages 2808–12 (1958).

De Modica et al.: Gazz. Chim. Ital., vol. 90, pages 434–39 (1960).